BORDEN & McLEAN.
Hand-Seeder.
No. 12,618.
Patented Apr. 3, 1855.
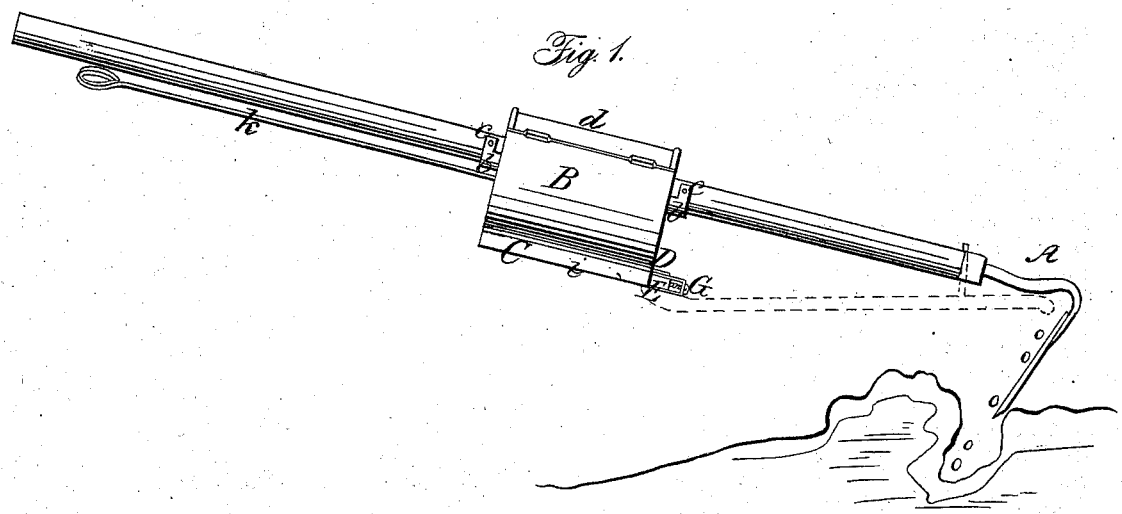
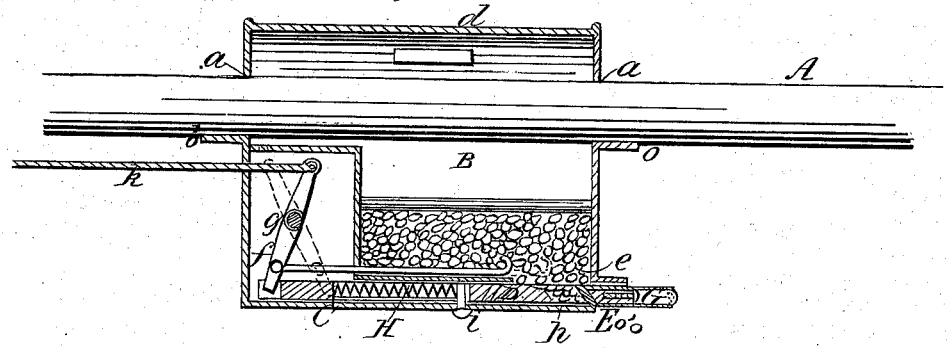

UNITED STATES PATENT OFFICE.

CHESTER B. BORDEN, BENJ. S. BORDEN, AND AARON R. McLEAN, OF WEST DRESDEN, NEW YORK.

IMPROVEMENT IN SEED-PLANTERS.

Specification forming part of Letters Patent No. 12,618, dated April 3, 1855.

*To all whom it may concern:*

Be it known that we, CHESTER B. BORDEN, BENJAMIN S. BORDEN, and AARON R. MC-LEAN, of West Dresden, in the county of Yates and State of New York, have invented a new and Improved Implement or Device for Planting Corn and other Seeds; and we do hereby declare that the following is a full, clear, and exact description of the same, reference being had to the annexed drawings, making a part of this specification, in which—

Figure 1 is an external view of our improvement. Fig. 2 is a longitudinal section of the same.

This invention relates to a new and improved implement for planting corn and other seeds by hand; and it consists in attaching to the handle of an ordinary hoe a chamber provided with a distributing or dropping device, which will be fully described hereinafter, whereby the necessary holes may be made in the ground, the corn or seed deposited therein and covered with earth, the hoe and distributing or dropping device being operated in conjunction with each other, as will be hereinafter shown.

To enable others skilled in the art to make and use our invention, we will proceed to describe its construction and operation.

A represents a hoe of the usual construction, and B represents a chamber or box constructed of sheet metal, and of any proper form. This chamber or box is secured in any proper manner to about the center of the handle of the hoe. In the drawings the ends of the chamber or box are provided with openings or holes $a$, through which the handle of the hoe passes, and flanges $b\ b$ project from the sides of the openings or holes, to which the handle is attached by screws $c$. The upper part of the chamber or box B is provided with a lid or cover, $d$.

To the lower part of the chamber or box B there is a rectangular chamber, C, which extends the whole length of the chamber or box B. This chamber communicates at its lower end with the chamber or box B by an opening, $e$, as shown in Fig. 2. Within the chamber C there is a slide, D, the back end of which bears against the lower end of a lever, $f$, which has its fulcrum at $g$ within the chamber or box B. The front end of the slide D has a slot or recess, $h$, through it, and said slot or recess may be increased in size or diminished by means of a small slide, E, and set-screw G. (See Fig. 2.)

Within the slide D there is placed a spiral spring, H, (see Fig. 2,) and directly in front of the spring there is a screw, $i$, which acts as a stop to the spring.

To the upper end of the lever $f$ there is attached a wire, $k$, and the lower end of the chamber C may be connected with any suitable spout, for the purpose of conveying the grain down to the blade of the hoe.

The way in which the implement is used will be readily seen. The chamber or box B is filled with the corn or seed to be planted, and the operator makes the necessary hole in the earth with the blade of the hoe. The wire $k$ is then pulled quickly by a movement of the finger, and the lower end of the slide D is forced out from the end of the chamber C, and the slot or recess $h$ being filled with seed, which passes into the slot or recess from the chamber or box B through the opening $e$, the seed is dropped into the conveying-spout, (indicated by the dotted lines,) and falls into the hole made into the earth by the blade of the hoe. The seed is then covered by a backward movement of the hoe, and this movement serves to shake the seed in the chamber or box B, and causes the seed to fall in the slot or recess $h$ in the slide. The backward movement of the slide is produced by the spiral spring H, it being understood that the action of the finger on the wire $k$ is quick, and the action of the finger is such as to allow the spring to throw the slide back. The finger may pass through a ring attached to the end of the wire $k$.

The above invention is extremely simple, not expensive to manufacture, and will operate well.

Having thus described our invention, what we claim as new, and desire to secure by Letters Patent, is—

Attaching to the handle of an ordinary hoe a chamber or box, B, which contains the corn or seed to be planted, said chamber or box being provided with a slide, D, having a slot or recess, $h$, in its lower end, which slot or recess may be increased or diminished in size by adjusting the small slide E, the slide D being arranged, as herein shown, so as to be operated by the finger of the operator and the spiral spring H, for the purpose of depositing the seed or corn in the holes or furrows in the earth made by the hoe, as herein shown and described.

CHESTER B. BORDEN.
BENJ. S. BORDEN.
AARON R. McLEAN.

Witnesses:
A. H. CONDIT,
C. J. TOWNSEND.